UNITED STATES PATENT OFFICE.

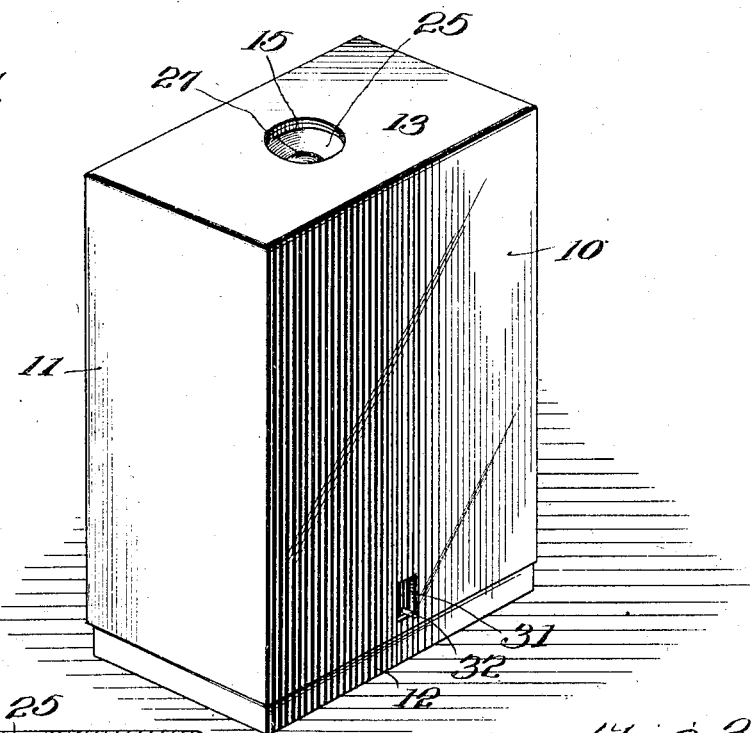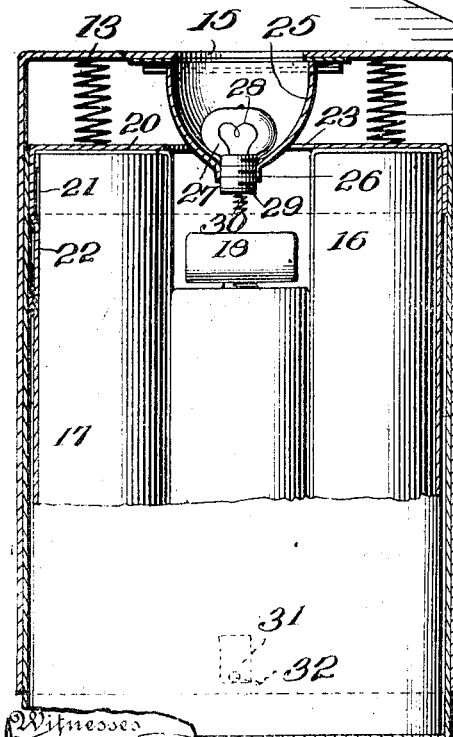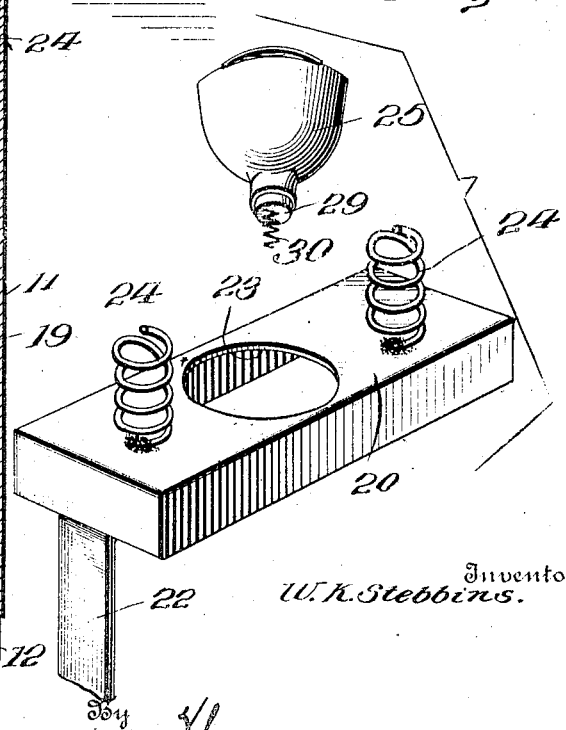

WALTER K. STEBBINS, OF FAIRMOUNT, NORTH DAKOTA.

EGG-TESTER.

1,091,778. Specification of Letters Patent. Patented Mar. 31, 1914.

Application filed January 28, 1913. Serial No. 744,751.

*To all whom it may concern:*

Be it known that I, WALTER K. STEBBINS, citizen of the United States, residing at Fairmount, in the county of Richland and State of North Dakota, have invented certain new and useful Improvements in Egg-Testers, of which the following is a specification.

My invention relates to new and useful improvements in egg testers and more particularly to egg testers of that type in which the egg to be tested is held before a brilliant light in order to render the same semi-transparent, and the object of my invention is to provide a device by means of which this may be readily accomplished.

A further object of my invention is to provide an egg tester including a body having an opening in its top large enough to partially admit an egg but not large enough to permit the egg to pass through and provided interiorly with an electric light for illuminating the egg.

A further object of my invention is to so arrange the egg tester that the light will be lighted only when an egg is being tested.

With these and other objects in view, my invention will be more fully described, illustrated in the accompanying drawing, and then specifically pointed out in the claims which are attached to and form a part of this application.

In the drawing: Figure 1 is a perspective view of my improved egg tester; Fig. 2 is a central vertical sectional view of the same; Fig. 3 is a detail perspective view of portions of the tester removed from the casing or body of the device.

Corresponding and like parts are referred to in the following description and indicated in all the views of the drawing by the same reference characters.

The preferred embodiment of my egg tester includes a body indicated as whole by the numeral 10 and comprising two telescopic members 11 and 12, the former of which is closed at its upper end as at 13, while the latter is closed at its lower end as at 14. Each of these members is preferably formed of sheet metal and the members are preferably rectangular in shape to prevent turning movement of one with respect to the other.

The closed upper end of the outer member 11 is provided centrally with an opening 15 of such size as to receive an egg, while at the same time small enough to prevent the passage of the egg into the casing. The lower or inner casing member forming the body is proportioned to receive a battery 16 made up of a plurality of dry cells 17 of the usual type employed in pocket flash lights and the like, one of these cells, namely, the central one, being shorter than the others and provided at its upper end with an upwardly directed spring plate 18 forming one of the terminals of the battery. As usual, the cells each include a casing of metal and in the present instance, this casing forms the other terminal of the battery. The battery as a whole is preferably inclosed in a casing or covering 19 which fits within the casing member 12 of the egg tester and which is closed at its upper end by a cover 20 formed of metal, the covering 19 being preferably formed of cardboard or other non-conducting material. This covering 19 is provided at one side with an opening 21 and the cover 20 is provided with a spring tongue 22 adapted, when the cover is in place, to extend through this opening and engage against one of the cells, whereby the cover 20 may serve as one terminal of the battery. This cover 20 is further provided centrally with an opening 23 corresponding to the opening 15 in the outer casing member 11.

The casing members 11 and 12 are normally supported in such a manner that the top 13 of the outer casing is spaced above the upper edge of the inner casing 12 as shown in Fig. 2 of the drawings, this being accomplished by helical springs 24 secured to the cover 20 of the battery and bearing by their free ends against the lower face of the closed end 13 of the outer casing.

Secured to the inner face of the closed end 13 of the outer casing, is a cup-shaped reflector 25 which in normal position extends by its inner end through the opening 23 of the battery cover and this inner end is shaped and threaded to provide a socket 26 for a small electric lamp 27. One terminal of the incandescent coil 28 of this lamp is electrically connected through its plug with the socket 26 in the usual manner, while the opposite end is electrically connected to the plug 29 which carries a downwardly depending helical spring 30.

As will be readily apparent from the foregoing description, a downward pressure upon the closed end 13 of the body member will move the outer casing downwardly over the inner casing to engage the free end of the spring 30 against the resilient terminal 18 of the battery and when this is done a circuit will be closed through the lamp, the current passing through the contact 18, spring 30, lamp, reflector 25, casing member 11, springs 24, cover 20 and tongue 22 back to the battery. It will therefore be seen that if an egg be positioned with one end extending through the opening 15 and if the outer casing member be pressed downwardly to complete this circuit, the light from the lamp will be reflected through the egg, permitting a ready inspection of the same.

In order to limit the relative movement of the inner and outer casings to prevent their complete disengagement, I provide the outer casing, at one side, with a slot 31 through which a pin 32, carried by the inner casing, extends, this slot being so proportioned as to permit the outer casing to be moved upwardly by the springs 28 to normally break the circuit and also so proportioned as to permit the outer casing to be forced downwardly a sufficient distance to close the circuit.

The above described egg tester is simple and economical in construction and occupies but small space and because of the fact that the light is burning only when the tester is in use, the cost of batteries for operating the same will be small. Moreover, the same motion which is required to position the egg brings the hand of the operator directly in place to operate the device and light the lamp and the mere raising of the hand to remove the egg permits the springs 24 to separate the casing members and break the light circuit.

It will of course be understood that I do not wish in any way to limit myself to the specific details of construction illustrated in the drawing and described in the above specification as various minor changes may be made at any time without in the slightest degree departing from the spirit of my invention.

Having thus described the invention, what is claimed as new is:

1. An egg tester including relatively movable telescopic casings, one of which is provided with an opening, a reflector carrying an electric lamp mounted in the casing having the opening therein and arranged in alinement with said opening, and means operable by the movement of one casing toward the other for closing the circuit through said lamp.

2. An egg tester including relatively movable telescopic casings, one of which is provided with an opening, a reflector carrying an electric lamp mounted in the casing having the opening therein and arranged in alinement with said opening, means operable by the movement of one casing toward the other for closing the circuit through said lamp, and means for normally holding the casings away from each other.

3. An egg tester including an inner casing member and an outer casing member telescopically mounted with their outer ends closed, one of said ends being provided with an opening, an electric lamp carried by the casing having the opening therein and arranged in alinement with said opening, means for normally holding said casings in slightly extended position, and means operable by the movement of one casing into the other to close a circuit through the light.

4. An egg tester including an inner casing member, a battery of dry cells in the inner casing, a resilient spring forming one terminal of said battery, a covering for the battery including a cover having a tongue forming another terminal of the battery, springs carried by the cover and extending upwardly therefrom, an upper casing member mounted for telescopic movement over the inner casing member and normally held in spaced relation above the same by engagement against said springs, and an electric lamp carried by said outer casing and electrically connected to the cover tongue, and a spring electrically connected with the lamp adapted for engagement against the spring terminal of the battery.

5. An egg tester including a battery inclosing casing, an outer casing telescopically mounted over the first and normally in spaced relation from the same by springs, said outer casing being provided with an opening, a cup-shaped reflector positioned in the outer casing to reflect light outwardly through the opening, an electric lamp mounted in the inner end of said reflector, and means operable by the movement of the outer casing toward the battery inclosing casing for closing a circuit through the battery and electric lamp.

6. An egg tester including a battery inclosing casing, an outer casing telescopically mounted over the first and normally in spaced relation from the same by springs, said outer casing being provided with an opening, a cup-shaped reflector positioned in the outer casing to reflect light outwardly through the opening, an electric lamp mounted in the inner end of said reflector, means operable by the movement of the outer casing toward the battery inclosing casing for closing a circuit through the battery and electric lamp, and means for limiting the relative movement of the battery inclosing casing and outer casing.

7. An egg tester including a battery inclosing casing, an outer casing telescopically mounted over the first and normally held in spaced relation from the same by springs, said outer casing being provided with an opening, a cup-shaped reflector positioned in the outer casing to reflect light outwardly through the opening, an electric lamp mounted in the inner end of said reflector, means operable by the movement of the outer casing toward the battery inclosing casing for closing a circuit through the battery and electric lamp, and means for limiting the relative movement of the battery inclosing casing and outer casing, said means including a pin carried by the battery inclosing casing and extending through a slot formed in the outer casing.

In testimony whereof I affix my signature in presence of two witnesses.

WALTER K. STEBBINS. [L. S.]

Witnesses:
 A. W. PUTNAM,
 WM. DOHLQUIST.

Copies of this patent may be obtained for five cents each, by addressing the "Commissioner of Patents. Washington, D. C."